United States Patent [19]

Umpleby

[11] Patent Number: 4,803,244

[45] Date of Patent: Feb. 7, 1989

[54] PROCESS FOR THE PREPARATION OF THERMOPLASTIC ELASTOMERS

[75] Inventor: Jeffrey D. Umpleby, Princeton, N.J.

[73] Assignee: Union Carbide Corporation, Danbury, Conn.

[21] Appl. No.: 120,969

[22] Filed: Nov. 16, 1987

[51] Int. Cl.$^4$ ................................................. C08F 8/00
[52] U.S. Cl. ..................... 525/105; 525/106; 428/447
[58] Field of Search ................. 525/105, 106; 428/447

[56] References Cited

U.S. PATENT DOCUMENTS 4,145,508  3/1979  Bargain et al. .................... 528/15
4,666,745  5/1987  Huhn et al. ........................ 525/106
4,695,602  9/1987  Crosby et al. ..................... 525/106

Primary Examiner—Melvyn J. Marquis
Attorney, Agent, or Firm—Saul R. Bresch

[57] ABSTRACT

A process for the preparation of a thermoplastic elastomer comprising admixing, under reaction conditions, an unsaturated elastomer containing carbon-carbon double bonds; an essentially saturated thermoplastic homopolymer or copolymer; a multifunctional organosilicon compound containing an average of at least two Si—H groups per molecules; and a catalyst capable of hydrosilylating the carbon-carbon double bonds of the unsaturated elastomer.

15 Claims, No Drawings

PROCESS FOR THE PREPARATION OF THERMOPLASTIC ELASTOMERS

TECHNICAL FIELD

This invention relates to a process for the preparation of a thermoplastic elastomer which is comprised of a crosslinked elastomer in combination with a thermoplastic polymer.

BACKGROUND ART

Thermoplastic elastomers are rubbery materials which can be thermoformed by techniques generally associated with thermoplastic resins. They normally contain elastomeric domains and crystalline or partially crystalline thermoplastic domains. The elastomeric phase lends rubbery properties, while the relatively hard thermoplastic phase provides strength below the melting point of the thermoplastic elastomer and processability above the melting point. Examples of elastomers used in thermoplastic elastomers are ethylene/propylene rubber (EPR), ethylene/propylene/diene rubber (EPDM), acrylonitrile-butadiene rubber (NBR), and natural rubber (NR). These elastomers may or may not be crosslinked. Examples of thermoplastic resins used in thermoplastic elastomers are polypropylene, high density polyethylene, low density polyethylene, polystyrene, and polyamides. When the elastomeric phase is crosslinked, the method of crosslinking must be selective to the elastomer so as to avoid crosslinking the thermoplastic phase, and thus retain processability. Typical crosslinking methods reported in the literature are based on sulfur, peroxide, phenolics, and ionic curing, all of which have serious drawbacks during manufacture or with respect to the end use of the resulting products.

The process of preparing thermoplastic elastomers by crosslinking an elastomer in the presence of a thermoplastic polymer is known as "dynamic curing". One technique of classical dynamic curing is described in a paper by Coran and Patel published in Rubber Chemistry and Technology, volume 53, 1980, pages 141 to 150, with reference to EFPDM/polypropylene based thermoplastic elastomers. Unfortunately, dynamic curing, as currently practiced, suffers from the generation of low molecular weight species, the use of toxic, noxious, or explosive reagents; and modification, e.g., viscosity changes, of the thermoplastic polymer.

DISCLOSURE OF THE INVENTION

An object of this invention, therefore, is to provide a process for the preparation of a thermoplastic elastomer, which, insofar as crosslinking is concerned, is selective for the elastomeric phase and yet avoids the disadvantages of the abovementioned curing techniques.

Other objects and advantages will become apparent hereinafter.

According to the invention, the above object is met by a process for the preparation of thermoplastic elastomers comprising admixing, under reaction conditions, an unsaturated elastomer containing carbon-carbon double bonds; an essentially saturated thermoplastic polymer; a multifunctional organosilicon compound containing an average of at least two Si—H groups per molecule; and a catalyst capable of hydrosilylating the carbon-carbon double bonds of the unsaturated elastomer.

DETAILED DESCRIPTION

Hydrosilylation is a chemical reaction that occurs by addition of the Si—H moiety across a carbon-carbon double bond (or a carbon-oxygen double bond). The use of this particular reaction insures that substantially no by products are formed and that no low molecular weight species are generated. The absence of toxic, noxious, or explosive reagents is of major importance for both the manufacture and use of resulting products. Further, by judicious choice of the crosslinking organosilicon compound, a person skilled in the art can modify the properties of the resulting thermoplastic elastomer so as to provide a product with special characteristics such as, for example, good filler acceptance or enhanced compatibility with other polymers in subsequent blending operations. Choice of the elastomeric phase will determine properties such as resistance toward chemicals, permeability, weatherability, and extrudability. Selection of the thermoplastic polymer will also influence these properties.

The scheme of crosslinking by hydrosilylation can be represented as follows:

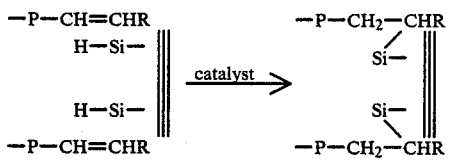

wherein —P is an elastomer backbone, R represents H or alkyl, and the three vertical lines represent the balance of the multifuntional organosilicon molecule.

The thermoplastic elastomer produced by subject process comprises an elastomer, which is essentially or partially crosslinked by hydrosilylation with a multifunctional organosilicon compound, and a thermoplastic polymer. The precursor for the thermoplastic elastomer comprises a base elastomer containing carbon-carbon double bonds, a multifunctional organosilicon compound containing an average of at least two Si—H bonds per molecule, a hydrosilylation catalyst, and a thermoplastic polymer that is relatively inert towards the hydrosilylation reaction. The term "average" accounts for the situation where a mixture of polysiloxanes is used to provide the multifunctional organosilicon compound component and not all of the polysiloxanes in the mixture contain at least 2 Si—H bonds per molecule.

Elastomers are defined in this specification to include synthetic homopolymers or copolymers based on at least two monomers having rubber-like characteristics and natural rubbers.

Examples of synthetic elastomers that can be crosslinked by hydrosilylation are ethylene-propylene-diene terpolymer rubbers (EPDM) wherein the diene can be 1,4-hexadiene, ethylidene norbornene, dicyclopentadiene, or 5-methyl-1,4-hexadiene; isobutylene-isoprene copolymers; polybutadiene; styrene-butadiene (or isoprene)-styrene block copolymers; acrylonitrile-butadiene rubbers (NBR); and styrene-butadiene rubbers. Mixtures or blends of any of the foregoing can be used if desired. Preferred elastomers are EPDM, NBR, and styrene-butadiene rubbers. The elastomers preferably contain at least one carbon-carbon double bond per 1000 carbon atoms and have a molecular weight of at least about 100,000. The amount of elastomer present in the final product depends on the type of compound desired but can be in the range of about 5 to about 90 percent by weight of the final product, i.e., the elastomer and the thermoplastic polymer.

Examples of the multifunctional organosilicon compounds, which can be used to hydrosilylate the elastomers, are polymethylhydrodimethylsiloxane copolymers terminated with trimethylsiloxy groups or alkoxy groups; polymethylhydrosiloxane polymers similarly terminated; polymethylhydrodimethylsiloxane methylsiloxane terpolymers similarly terminated; bis(dimethylsilyl)benzene; bis(dimethylsilyl)alkanes; and silicone fluids, provided that they contain an average of at least two Si—H groups per molecule.

The multifunctional organosilicon compound useful in the invention is preferably a polysiloxane compound or mixture of polysiloxane compounds containing an average of at least two Si—H groups per molecule comprised essentially of 2 to about 100 siloxane units having the formulae:

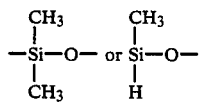

and 0 to about 5 siloxane units having the formulae:

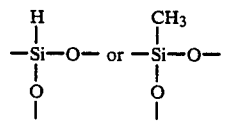

in any sequence or combination and having terminal groups which are hydroxy, alkoxy, or trimethylsiloxy.

Examples of preferred multifunctional organosilicon compounds are dodecyloxy tetra(methylhydrosiloxy)dodecane, dodecyloxy tetra(dimethylsiloxy) tetra(methylhydrosiloxy)dodecane, octyloxy tetra(dimethylsiloxy)tetra(methylhydrosiloxy) octane; para bis(dimethylsilyl)benzene; bis(dimethylsilyl)ethane; and bis(dimethylsilyl)hexane. The amount of multifunctional organosilicon compound employed in the present invention can be in the range of about 0.01 mole equivalent Si—H/C═C to about 5 mole equivalents Si—H/C═C, and preferable about 0.25 to about 2 mole equivalents Si—H/C═C of the elastomer.

Hydrosilylation catalysts useful in this invention can be found in the complexes of Group VIII transition metals described in "Organometallic Chemistry Review", Lukevics et al., volume 5, 1977, pages 1 to 179, incorporated by reference herein. Any catalyst, or catalyst precursor capable of generating a catalyst in situ, which will hydrosilylate the carbon-carbon double bonds of the elastomer, can be used. Suitable catalysts include chloroplatinic acid, tris(triphenylphosphine) rhodium chloride, dicobalt octacarbonyl, iron pentacarbonyl, bis(tri-phenylphosphine) palladium dichloride or diacetate, bis(acetylacetonato) nickel with triphenylphosphine, and copper (I) chloride ethylenediamine complexes. Preferred catalysts are complexes of rhodium, platinum, palladium and nickel such as bis(cyclooctadienerhodium chloride), bis(triphenylphosphine) nickel dichloride, bis(triphenylphosphine) palladium diacetate, and chloroplatinic acid. A particularly preferred catalyst is a complex of rhodium having the general formula $L_1L_2RhX$ wherein $L_1$ and $L_2$ are neutral coordinating ligands to the metal center such as 1,5-cyclooctadiene (COD); ethylene; cyclooctene; 1,2-divinyl-1,1,2,2-tetramethyldisiloxane; carbon monoxide; a phosphine; or a phosphite, and X is a halide or a psuedo halide ligand, e.g., $[(COD)RhCl]_2$. This preferred catalyst is more fully described in U.S. patent application Ser. No. 102,910 filed on Sept. 30, 1987, which is incorporated by reference herein.

The amount of catalyst can be in the range of about 5 to about 10,000 parts per million (ppm) by weight based on the weight of the elastomer. The preferred amount of catalyst is in the range of about 20 to about 1000 ppm.

Examples of thermoplastic polymers, which can be used in the invention, are polypropylene, polyethylene, copolymers of ethylene with alpha-olefins having 3 to 12 carbon atoms, copolymers of ethylene with alkyl esters of unsaturated carboxylic acids and alkenyl esters of saturated carboxylic acids, polymethylpentene, polystyrene, and polyamides. Other essentially saturated thermoplastic polymers, i.e., thermoplastic polymers which are essentially inert to the elastomer, the multifunctional organosilicon compound, and hydrosilylation catalyst, would also be suitable. Additional examples are (i) thermoplastic polymers which are prepared under high, medium, or low pressure using transition metal based catalysts such as high density polyethylene; high, medium, low, or very low density copolymers of ethylene with alpha olefins having 3 to 12 carbon atoms; polypropylene; and polymethylpentene; (ii) thermoplastic polymers prepared by free radical initiation such as polystyrene; low density polyethylene; ethylene/methyl or ethyl acrylate copolymers; ethylene/butyl acrylate copolymers; and ethylene/vinyl acetate copolymers; and (iii) thermoplastic polymers prepared by condensation, e.g., nylon 6, nylon 66, nylon 11, and nylon 12. Mixtures or blends of any of the thermoplastic polymers can be used if desired. The preferred thermoplastic polymers are high density polyethylene, linear low density polyethylene, low density polyethylene, and polypropylene. The polyethylenes preferably have a melt index of 0.1 to 30 grams per 10 minutes (measured at 190° C. and 2.16 Kg) and the polypropylene a flow index of 0.2 to 50 (measured at 230° C. and 2.16 Kg), all according to ASTM D1238. The thermoplastic polymer can be present in an amount of about 10 to about 95 percent by weight based on the combined weight of the thermoplastic polymer and the elastomer. The elastomer can be present in an amount of about 5 to about 90 percent by weight based on the combined weight of the thermoplastic polymer and the elastomer.

Subject process comprises heating together the four components under conditions which promote crosslinking of the elastomer by the multifunctional organosilicon compound under the influence of the hydrosilylation catalyst and which effectively disperse the crosslinked (or partially crosslinked) elastomer in the thermoplastic polymer. A precursor can also be formed by mixing together the elastomer, the multifunctional organosilicon compound, and the catalyst in the same manner. The precursor is then blended with the thermoplastic polymer to achieve adequate dispersion. The four component process is preferred, however.

The process of heating together the elastomer, the multifunctional organosilicon compound, hydrosilylation catalyst and thermoplastic polymer to cause hydrosilylation of the elastomer and its dispersion in the thermoplastic polymer is preferably carried out with mechanical mixing at a temperature at or above the melting temperature of the thermoplastic polymer. The mechanical mixing can be carried out using commercial apparatus capable of mixing polymer melts, e.g., melt blenders, single screw extruders or kneaders, or coor counter rotating turn screw extruders. The temperature will normally be in the range of about 110 to about 300° C. The reaction is continued for a sufficient time to permit satisfactory hydrosilylation to take place and achieve adequate dispersion of the crosslinked elastomer in the thermoplastic polymer. An inert gas can be used to exclude oxygen from the reaction if required. The product thermoplastic elastomer can be granulated, e.g., to form pellets, for storage or further processing, or fed directly to a die or mold, for the production of pipe, wire and cable coating, or shaped articles.

The multifunctional organosilicon compound and the hydrosilylation catalyst can be added to the elastomer and thermoplastic polymer by any suitable compounding technique, for example, by soaking the multifunctional organosilicon compound into the elastomer at a temperature below the boiling point of the multifunctional organosilicon compound or by introducing the multifunctional organosilicon compound into an extruder or melt blender by means of a liquid pump. The hydrosilylation catalyst can be added as a masterbatch concentrate if desired. The multifunctional organosilicon compound crosslinking agent lends functionality to the thermoplastic elastomer thus enabling its use as a polymer modifier in blends with other polymers.

The thermoplastic elastomers of the present invention can contain conventional additives, which can be introduced into the thermoplastic polymer or elastomer before, during or after the hydrosilylation step. Examples of such additives are antioxidants, processing aids, fillers, pigments, extender oils, metal deactivators, ultraviolet stabilizers, foaming agents, water tree growth retardants, voltage stabilizers, and flame retardants. Fillers may be employed, e.g., in the range of about 1 to about 300 percent by weight based on the weight of the final product, i.e., the crosslinked elastomer dispersed in the thermoplastic polymer.

The thermoplastic elastomers of this invention and composites based thereon can be used in the manufacture of various articles in the same manner as conventional thermoplastic elastomers, e.g., they can be used in blow molding, injection molding, film blowing, calendering, extrusion, and extrusion coating. They are particularly preferred for fiber optic and wire and cable coating applications as well as for pipe and tubing. Subject thermoplastic elastomers can also be used for modifying the properties of other polymers by blending or compounding.

The invention is illustrated by the following examples. Parts are by weight.

EXAMPLES 1 to 14

A hydrosilylation catalyst masterbatch is prepared by blending, on a two roll mill at 125° C., 1 gram of bis(cyclooctadienerhodium chloride) with 500 grams of low density polyethylene (density 0.923 g/cc; melt index 1.9 g/10 min). The resulting yellow compound is granulated.

The following are mixed in a Brabender mixing head;

| | | Parts by Weight |
|---|---|---|
| (i) | a terpolymer of ethylene (57 wt %), propylene (38 wt %), and ethylidene norbornene (5 wt %) | 67.0 |
| (ii) | polypropylene (flow rate 5 at 230° C. and 2.16 kg) | 33.0 |
| (iii) | a mixture of multifunctional organosilicon compounds of nominal structure: | |
| | R-D$_x$-D'$_y$-R' wherein | 4.47 |
| | R = $C_{12}H_{25}O$ | |
| | R' = $C_{12}H_{25}$ | |
| | D = $[(CH_3)_2SiO]$ | |
| | D' = $[CH_3HSiO]$ | |
| | x = 3 to 7 | |
| | y = 3 to 7 | |
| (iv) | catalyst masterbatch (4.20 parts correspond to 84 ppm rhodium complex or 35 ppm rhodium metal) | 4.20 |

Component (i) is fluxed at 120° C. for 3 minutes at 75 revolutions per minute (rpm). Component (iii) is then added by means fo a syringe and the temperature is increased to 180° C. At 140° C., component (ii) is added, and, on reaching 180° C., component (iv) is added. The mixture is fluxed for 5 minutes at 180° C. The torque is observed to increase and the yellow color disappears. The mixture is removed from the Brabender mixing head and compression molded at 185° C. into a plaque having a thickness of 1.8 millimeters, and quench cooled. The plaque is tested in a rheometer at 182° C. and the torque reading is found to be 13 foot-pounds.

EXAMPLE 2

Example 1 is repeated except that component (ii) is not added. The rheometer torque reading is 6 foot-pounds.

EXAMPLE 3

Example 1 is repeated except that component (i) is a terpolymer of ethylene (67 wt %), propylene (28 wt %), and ethylidine norbornene (5 wt %). The rheometer torque reading is 18 foot-pounds.

EXAMPLE 4

Example 3 is repeated except that component (iv) is not added. The rheometer torque reading is 10 foot-pounds.

EXAMPLE 5

Example 1 is repeated except that component (i) is a terpolymer of ethylene (61 wt %), propylene (32.6 wt %), and 1,4-hexadiene (6.4 wt %). The rheometer torque reading is 21 foot-pounds.

EXAMPLE 6

Example 5 is repeated except that component (iv) is not added. The rheometer torque reading is 4 foot-pounds.

EXAMPLE 7

Example 5 is repeated except that 6.7 grams of component (iii) is added. The rheometer torque reading is 26 foot-pounds.

EXAMPLE 8

Example 7 is repeated except that 8.92 rams of component (iii) is added. The rheometer torque reading is 14 foot-pounds.

EXAMPLE 9

Example 5 is repeated except that one part of dicumyl

EXAMPLE 14

Example 13 is repeated except that the product is from Example 9. The rheometer torque reading is 16 foot-pounds.

The properties of the compression molded plaques of examples 1 to 9, 13, and 14 are set forth in the following Table:

TABLE

| | Example | | | | | | | | | | |
|---|---|---|---|---|---|---|---|---|---|---|---|
| | 1 | 2 | 3 | 4 | 5 | 6 | 7 | 8 | 9 | 13 | 14 |
| Property | | | | | | | | | | | |
| Tensile strength to Break-ASTM D-638 (MPa) | 5.3 | 4.7 | 14.6 | 9.9 | 9.0 | 3.2 | 8.8 | 6.9 | 8.1 | 8.0 | 5.9 |
| Elongation to Break-ASTM D-638 (%) | 240 | 65 | 550 | 600 | 210 | 35 | 180 | 165 | 250 | 90 | 235 |
| 100% Modulus-ASTM D-638 (MPa) | 2.1 | — | 9.1 | 7.7 | — | — | — | — | — | — | — |
| Shore Hardness A/D ASTM D-2240 | 88/26 | 91/27 | 93/40 | 91/35 | 88/25 | 85/18 | 87/26 | 87/25 | 86/26 | 93/— | 94/— |
| Tensile set-ASTM D-412 (%) | 43 | — | 29 | 38 | 16 | — | 14 | 28 | 18 | 24 | 22 |
| Heat Elongation-ICEA T 28562 (150 C/0.2 MPa/15 min) (%) | 10 | 30 | 10 | 10 | 4 | br | 6 | — | — | — | — |
| Gel content-ASTM D-2765 (%) | 21.8 | 0.2 | 9.8 | 0.9 | 45 | 0 | 50 | 21 | 51.8 | — | — | peroxide is used instead of components (iii) and (iv). The rheometer torque reading is 10 foot-pounds.

EXAMPLE 10

Example 5 is repeated except that component (i) contains 61.6 percent by weight ethylene, 33.8 percent by weight propylene, and 5.6 percent by weight ethylidene norbornene and component (ii) is a propylene copolymer [MFI (230/2.16)=5; density=0.900 g/cc]. The rheometer torque reading is 7.5 foot-pounds.

EXAMPLE 11

Example 10 is repeated except that component (i) is the same as in Example 1. The rheometer torque reading is 16 foot-pounds.

EXAMPLE 12

Example 10 is repeated except that component (iv) is not added. The rheometer torque reading is 4 foot-pounds.

EXAMPLE 13

One hundred parts of the product from Example 5 is reprocessed in a Brabender mixing head at 180° C. for 7 minutes at 60 rpm with the following additives:

| Additive | Parts by Weight |
|---|---|
| 1. clay | 30 |
| 2. zinc oxide | 5 |
| 3. antioxidant | 2 |
| 4. secondary antioxidant | 1 |
| 5. metal deactivator | 0.3 |

A compression molded plaque is pressed at 195° C. and shows a rheometer torque reading of 29 foot-pounds.

EXAMPLE 15

Example 1 is repeated except that component (i) is a styrene-butadiene styrene block copolymer with a styrene to rubber ratio of 28/72 and component (ii) is the same as in Example 10. A compression molded plaque is pressed at 185° C. and quench cooled. The rheometer torque reading is 19.5 foot-pounds. There are no signs of sweat out of the siloxane. The heat elongation is 43 percent.

EXAMPLE 16

Example 15 is repeated except that component (iv) is omitted. The rheometer torque reading is 1.5 foot-pounds. There are signs of sweat out of the siloxane.

EXAMPLE 17

Example 5 is repeated except that component (ii) is replaced by high density polyethylene (density=0.948 g/cc; flow index (190° C./21.6 Kg)=20) containing 200 ppm antioxidant (BHT). The rheometer torque reading is 29.5 foot-pounds. The tensile strength to break is 6.9 MPa; the elongation to break is 350%; the 100% Modulus is 4.5 MPa.

EXAMPLE 18

Example 17 is repeated except the component (iv) is omitted. The rheometer torque reading is 4 foot-pounds. Sweat-out of the siloxane is observed.

EXAMPLE 19

Example 17 is repeated except the 2.85 grams of methyltetrasiloxane are used instead of component (iii). A compression molded plaque shows rheometer torque reading of 18 foot-pound.

I claim:
1. A process for the preparation of a thermoplastic elastomer comprising admixing, under reaction condi- tions, an elastomer containing carbon-carbon double bonds; an essentially saturated thermoplastic homopolymer or copolymer; a multifunctional organosilicon compound containing an average of at least two Si—H groups per molecule; and a catalyst capable of hydrosilylating the carbon-carbon double bonds of the unsaturated elastomer.

2. The process defined in claim 1 wherein the elastomer contains at least one carbon-carbon double bond per 1000 carbon atoms.

3. The process defined in claim 1 wherein the elastomer has a molecular weight of at least about 100,000.

4. The process defined in claim 1 wherein the multifunctional organosilicon compound is a polysiloxane compound or mixture of polysiloxane compounds containing an average of at least two Si—H groups per molecule comprised essentially of 2 to about 100 siloxane units having the formulae:

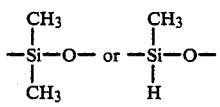

and 0 to about 5 siloxane units having the formulae:

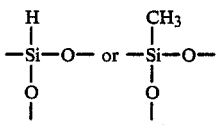

in any sequence or combination and having terminal groups which are hydroxy, alkoxy, or trimethylsiloxy.

5. The process defined in claim 1 wherein the amount of multifunctional organosilicon compound is in the range of about 0.01 to about 5 mole equivalents of Si—H groups per one mole equivalent of carbon-carbon double bonds.

6. The process defined in claim 1 wherein the amount of multifunctional organosilicon compound is in the range of about 0.25 to about 2 mole equivalents of Si—H groups per one mole equivalent of carbon-carbon double bonds.

7. The process defined in claim 1 wherein the hydrosilylation catalyst is an organometallic complex of a Group VIII transition metal.

8. The process defined in claim 7 wherein the transition metal is rhodium, platinum, palladium, or nickel.

9. The process defined in claim 1 wherein the amount of hydrosilylation catalyst is in the range of about 5 to about 10,000 parts per million by weight based on the weight of the elastomer.

10. The process defined in claim 1 wherein the amount of hydrosilylation catalyst is in the range of about 20 to about 1000 parts per million by weight based on the weight of the elastomer.

11. The process defined in claim 1 wherein the thermoplastic homopolymer or copolymer is polyethylene, polypropylene, or a copolymer of ethylene and at least one alpha-olefin having 3 to 12 carbon atoms.

12. The process defined in claim 1 wherein the components are mixed at a temperature of at least about the melting point of the thermoplastic homopolymer or copolymer.

13. The product of the process defined in claim 1.

14. An extruded article comprising the product defined in claim 13.

15. An extrusion coated article wherein the coating is the product defined in claim 13.

* * * * *